(12) United States Patent
Janssen et al.

(10) Patent No.: US 7,967,668 B2
(45) Date of Patent: Jun. 28, 2011

(54) METHOD AND APPARATUS FOR THE SEPARATE HARVESTING OF BACK SKIN AND BACK MEAT FROM A CARCASS PART OF SLAUGHTERED POULTRY

(75) Inventors: Petrus Christianus Hendrikus Janssen, Wilbertoord (NL); Johannes Gerardus Maria Gerrits, Rijkevoort (NL); Adrianus Josephes van den Nieuwelaar, Gemert (NL)

(73) Assignee: Stork PMT B.V., Boxmeer (NL)

( * ) Notice: Subject to any disclaimer, the term of this patent is extended or adjusted under 35 U.S.C. 154(b) by 85 days.

(21) Appl. No.: 12/520,310

(22) PCT Filed: Dec. 13, 2007

(86) PCT No.: PCT/NL2007/000316
§ 371 (c)(1),
(2), (4) Date: Jun. 19, 2009

(87) PCT Pub. No.: WO2008/078982
PCT Pub. Date: Jul. 3, 2008

(65) Prior Publication Data
US 2010/0029186 A1 Feb. 4, 2010

(30) Foreign Application Priority Data
Dec. 22, 2006 (NL) .................................... 1033122

(51) Int. Cl.
*A22B 5/16* (2006.01)
(52) U.S. Cl. ....................................................... 452/125
(58) Field of Classification Search .................. 452/125, 452/127–130, 132, 133
See application file for complete search history.

(56) References Cited

U.S. PATENT DOCUMENTS

| 3,930,282 A | 1/1976 | Martin et al. |
| 4,723,339 A | 2/1988 | van de Nieuwelaar et al. |
| 5,183,434 A | 2/1993 | Scheier et al. |

(Continued)

FOREIGN PATENT DOCUMENTS
EP 0 519 570 A1 12/1992

*Primary Examiner* — Thomas Price
(74) *Attorney, Agent, or Firm* — Birch, Stewart, Kolasch & Birch, LLP

(57) ABSTRACT

A method for the harvesting of back skin from a carcass part of slaughtered poultry, from which carcass part the breast cap has been removed, wherein the carcass part initially consisting of at least a part of the upper back and at least a part of the legs connected to the back, wherein the part of the upper back consists of back meat and back skin, and wherein the leg parts consist of at least the thighs and are provided at least partially with leg skin, the leg skin being connected at least partially to the back skin, which carcass part has a front, a rear and two sides. The method includes the following steps of suspending the carcass part in a product carrier, the product carrier engaging the leg parts, making a first and a second side cut in the hanging carcass part, which side cuts on the sides are located on the side parts on both sides of the carcass part and extend substantially perpendicularly to the vertebral column, wherein each side cut separates at least the leg skin on the respective side of the carcass part from the back skin, detaching the back skin from the back meat, and harvesting the back meat after the back skin has been detached from the back meat, for example by detaching the back meat from the remainder of the carcass part.

25 Claims, 3 Drawing Sheets

U.S. PATENT DOCUMENTS

| | | | |
|---|---|---|---|
| 5,188,559 A * | 2/1993 | Hazenbroek | 452/167 |
| 5,248,277 A * | 9/1993 | Bos et al. | 452/125 |
| 5,472,377 A * | 12/1995 | Andrews et al. | 452/149 |
| 6,142,863 A * | 11/2000 | Janssen et al. | 452/165 |
| 6,322,438 B1 * | 11/2001 | Barendregt et al. | 452/167 |
| 6,475,076 B1 * | 11/2002 | Rheingans et al. | 452/167 |
| 6,736,717 B1 * | 5/2004 | Annema et al. | 452/172 |
| 7,115,030 B2 * | 10/2006 | van Hillo et al. | 452/167 |

* cited by examiner

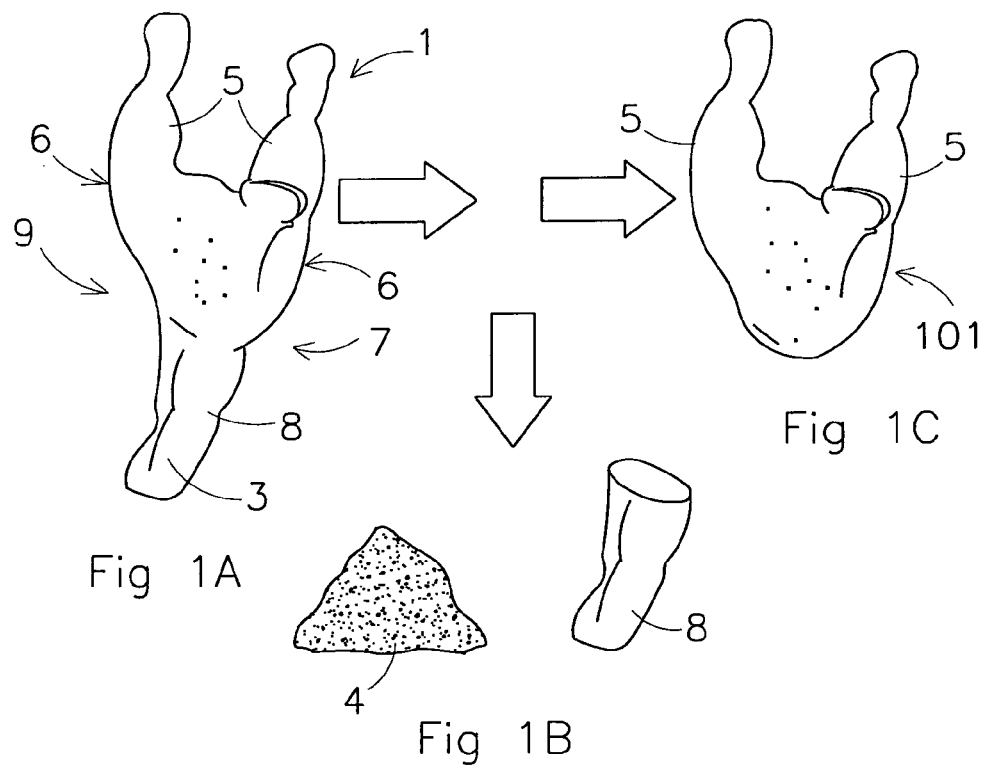
Fig 1A
Fig 1B
Fig 1C
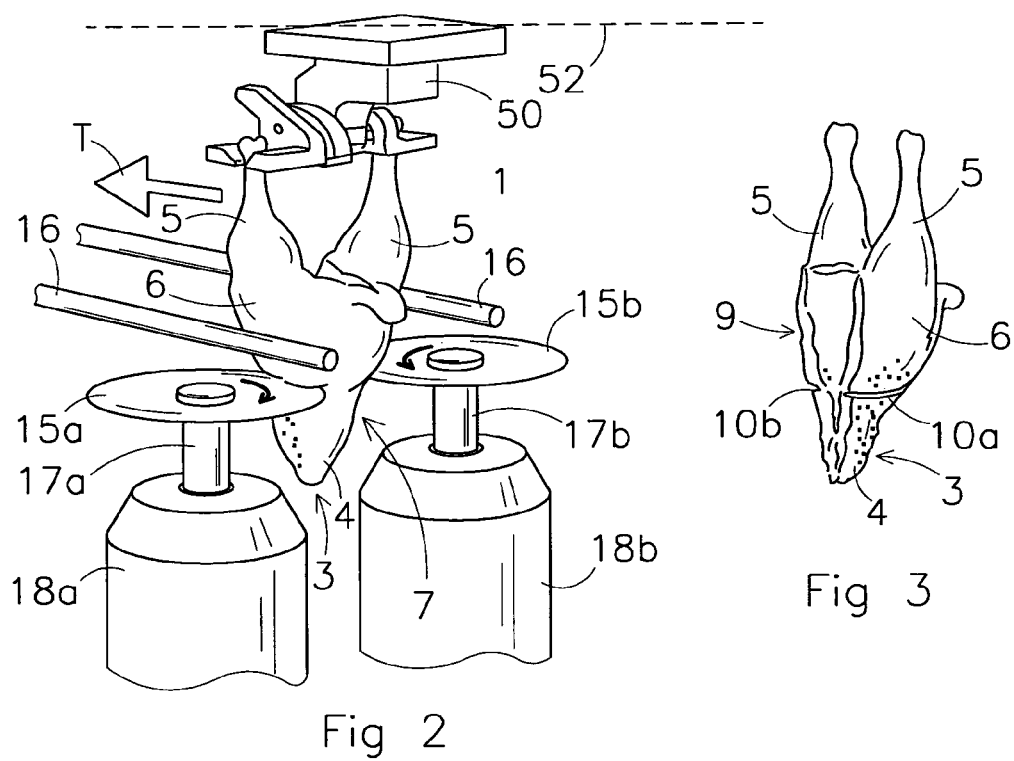
Fig 2
Fig 3

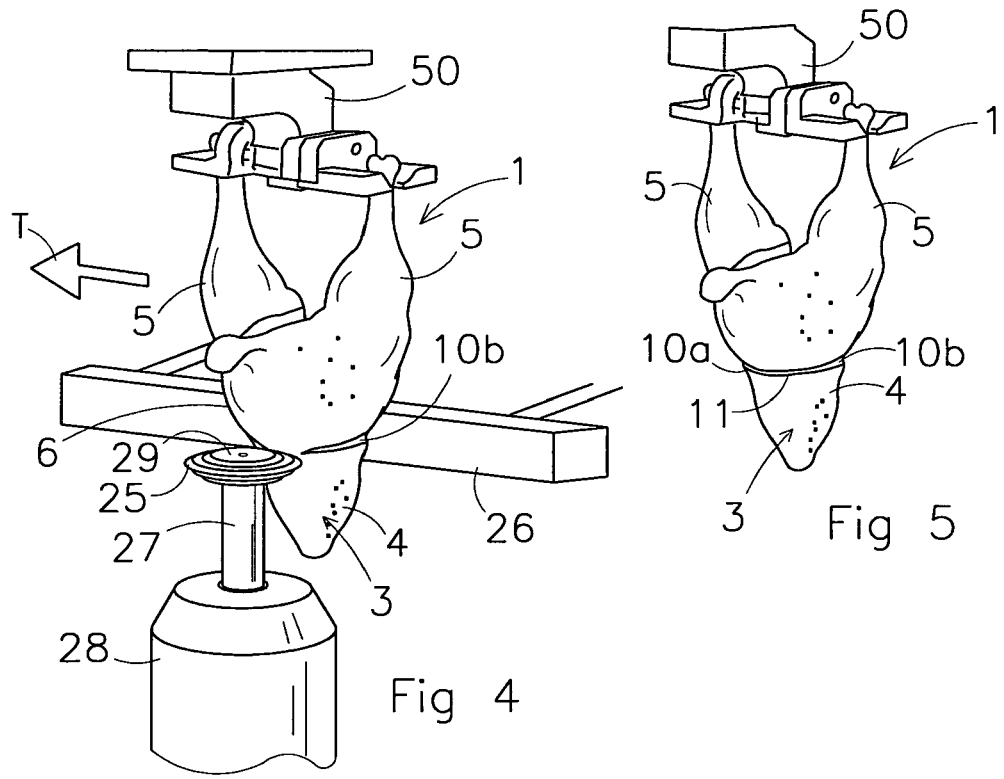
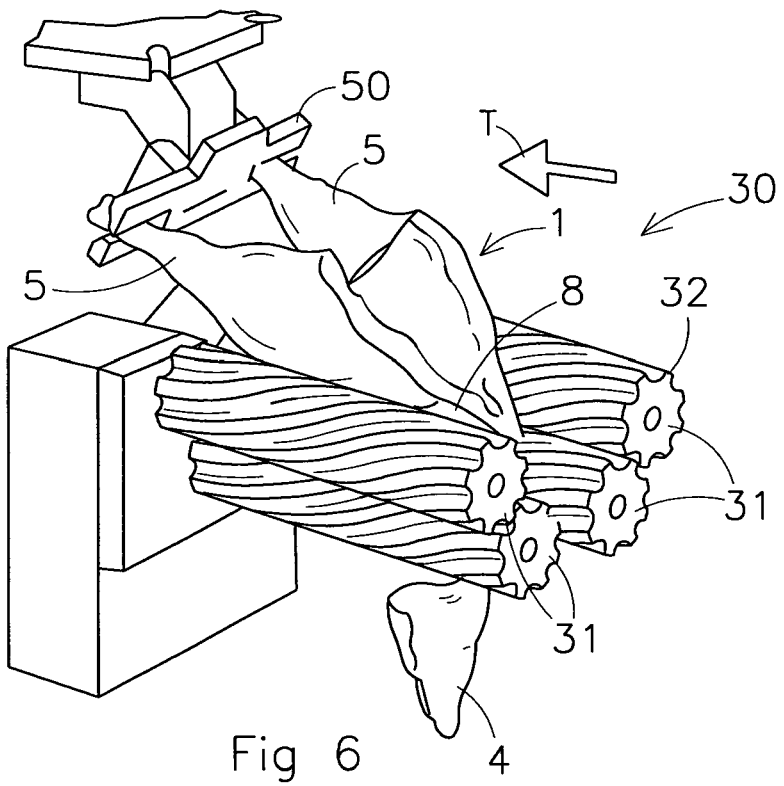

METHOD AND APPARATUS FOR THE SEPARATE HARVESTING OF BACK SKIN AND BACK MEAT FROM A CARCASS PART OF SLAUGHTERED POULTRY

FIELD OF THE INVENTION

The invention relates to the processing of a carcass part of slaughtered poultry.

BACKGROUND OF THE INVENTION

It is known in the art to divide a carcass of slaughtered poultry, after evisceration, into a first part which comprises the breast (in particular, the first part is a breast cap) and a second part which comprises the legs and a part of the upper back. The first part is subsequently attached to a product carrier which engages the inside of the carcass part. Afterwards, the first part of the carcass is conveyed by this product carrier along one or more processing stations. The second part of the carcass is conveyed, hanging by its legs, along one or more processing stations.

After the division, the second part of the carcass thus still comprises a piece of the upper back. Products such as chicken legs, drumsticks, thigh pieces or skinned leg meat are usually made from the second part. Before these products can be made, the back piece has to be removed because it cannot remain attached to these products. Therefore, usually the back piece is cut away from a second part of the carcass of this type. Afterwards, the remaining part is split in two before the separate leg parts are processed further to form, for example, chicken legs, drumsticks and/or thigh pieces.

In the above-described known method, the back skin which is present on the upper back remains attached to the back meat. Subsequently, the back pieces comprising the back skin are sold as a separate product or supplied for further processing, for example to form convenience products.

The above-described method is not satisfactory. The end products obtained yield insufficient economic value.

SUMMARY OF THE INVENTION

The object of the invention is to provide an improved method and apparatus for the processing of a carcass part of slaughtered poultry.

The invention achieves this object by a method for the harvesting of back skin from a carcass part of slaughtered poultry, and in combination, a product carrier for conveying of a carcass part and an apparatus for the harvesting of back skin from the carcass part of slaughtered poultry.

The invention allows the back meat to be harvested after the harvesting of the backskin. The back piece comprising back meat which is now free from back skin has a higher economic value than a back piece to which the back skin is still attached, in particular because the fat content is reduced by removing the back skin. The back skin thus harvested also has a relatively high economic value. The back skin contains, inter alia, collagen, allowing it to be sold as an independent product and ensuring an attractive source of income.

Before the relevant portion of the process commences, the carcass part has at least a part of the upper back (the back piece) and at least a part of each of the legs. The leg parts which are present are still connected, at least in part, to the back piece. The back piece has both back meat and back skin. The leg parts concern at least the thighs and are at least partially covered with leg skin. The leg skin is at least partially connected to the back skin which is present on the back piece.

In the method, the carcass part to be processed is first hung by its legs in a product carrier. It will be clear that the carcass part can in practice be suspended by its legs also in an earlier stage of the slaughtering process and that one or more other processing steps can be carried out between the steps relevant in the present case and that suspending.

Preferably, a precut is formed at three locations in the carcass part:
- on both sides of the carcass part, so the leg skin on the respective side of the carcass part is separated from the back skin, and
- on the rear side of the carcass part, in the centre, so the leg skin and the back skin are separated from each other at this location.

The precuts on the sides of the carcass part are made between the respective thigh and the back of the carcass part hanging from the product carrier.

The suspending of the carcass part by its legs has the advantage of allowing the back skin to be harvested in a controllable manner. It is also possible, in a suitable embodiment of the method and apparatus, to harvest the back meat in the same line as that in which the remainder of the carcass part, in particular the leg parts, is processed.

A further advantage of the apparatus and the method according to the invention is that specific poultry products can be made with a higher degree of automation/mechanization, whereas the production thereof previously required undesirable effort, including in particular manual operations. Examples of this include barbecue sticks for the Australian market which comprise a shoulder blade and the meat surrounding it. In the past, it was not possible to produce this product automatically in a line, while the partially manual production led to an excessively expensive product. The apparatus and method according to the invention allow products of this type to be produced, conversely, at an acceptable price.

It is possible to form separate precuts at the above-mentioned locations. This then results in two side cuts and a back cut. However, it is also possible to form a continuous cut along two or more of the above-indicated locations in the carcass. Thus, for example, a single, combined precut can be made, the back skin and leg skin being separated from each other at all three of the above-mentioned locations.

If three separate cuts are selected, it is possible to make first the side cuts and then the back cut but also to make first the back cut and then a side cut or the two side cuts. The side cuts can be made at the same time, although this is not necessary. It is possible for one or more of the aforementioned cuts to be formed as a series of smaller partial cuts or perforations.

Another option is to make one of the side cuts first, then the back cut and then the other side cut. If a single continuous cut is selected, then it is advantageous to stick to this order.

After the precuts have been made on the sides and preferably also on the rear side, the back skin has, at least for the most part, been cut loose from the skin on the legs. If three separate cuts are formed, it may be that the back cut and the side cuts do not fully join up but, because the remaining connections between the back skin and leg skin are relatively narrow in relation to the length of the cuts, in practice this does not present any problems during the harvesting of the back skin.

When making of the precuts in the sides, at least the skin is cut through. The cutter which make these cuts, optionally as part of a longer, if appropriate single, continuous, cut, can, however, also be adjusted in such a way that the meat lying under the skin is also cut into or cut through.

When making of the back cut or the part of the continuous cut at the location of the back, preferably only the skin is cut through and the underlying meat is not cut into or is cut into only slightly. The vertebral column is preferably not cut through. This is because once the back skin has been harvested, the back piece has still to be separated from the legs. Good positioning of the carcass part to be processed is important for this processing. It is in this case advantageous if the strong connection which the vertebral column provides is still present.

If separate or interrupted precuts are selected, the precuts are preferably located substantially in line with one another.

If separate or interrupted precuts are selected, the precuts preferably almost join up with one another.

The apparatus according to the invention comprises a first cutter for making the side cuts on the sides of the carcass part.

In a possible embodiment, the first cutter comprises two knifes: a first knife for making the first side cut and a second knife for making the second side cut on the other side of the carcass part.

For making a cut, the carcass part and the cutter which makes the respective cut move with respect to each other. Generally speaking, the carcass part will be moved by the product carrier along a predetermined path and the cutter are arranged in a substantially stationary position, if appropriate resiliently arranged, in the frame of the apparatus.

In a possible embodiment it is envisaged that the first cutter to comprise two knifes which are arranged on both sides of the path along which the product carrier moves the carcass part.

The invention can be carried out in an apparatus which also comprises a second cutter. This second cutter is then used for making the back cut, whereas the first cutter preferably comprises two separate knifes—each for one cut on one side. This variation is particularly suitable if the making of three separate precuts is selected: one on each side and one cut on the back.

The cutter can be provided with rotating, for example circular, blades and/or static blades.

In a variation, the apparatus can comprise a single knife, for example a rotating or static blade. The carcass part is in this case guided with respect to the knife in such a way (and/or the knife is guided along the carcass part in such a way) that the single knife makes the aforementioned precuts, preferably as a single continuous cut. The relative movement between the knife and carcass part will in this case generally include both rotational and translational movements. In this embodiment, the first and the second cutter are integrated into a single knife.

The invention also includes a variation of the method and the apparatus in which merely the two side cuts, and no back cut, are formed. The side cuts in this case extend sufficiently far that the ends of the side cuts on the side of the vertebral column are set apart from one another by at most 40 millimetres. A connection therefore remains between the back skin and leg skin, which is torn loose during the harvesting of the back skin. In this embodiment, the distance between the ends of the side cuts on the side of the vertebral column is preferably between 10 and 20 millimetres; more preferably, the distance is 15 mm. Also this embodiment provides the possibility not only of cutting into the skin but also of cutting into or even cutting through the meat which is located therebelow.

Preferably, the apparatus comprises one or more guides for the carcass part that ensure that the carcass part is positioned with respect to one or more of the cutter and/or the back skin harvester.

Preferably, a back skin harvesting device, or back skin harvester, which is optionally used comprises at least two interacting rolls which are each provided with teeth, such as a helical profile. The rolls are preferably arranged in such a way that their axial direction runs substantially parallel to the direction in which the product carriers move the carcass parts. Preferably, the rolls of the back skin harvester are positioned next to one another with a certain spacing. This prevents the back skin from becoming damaged to an undesirable extent during the harvesting. Alternatively, other types of back skin harvested can be used. Examples include a back skin harvester based on de-rinding rolls or a back skin harvester in which a single roll interacts with a plate rather than with a second roll. The rolls which are used can be positioned, not with their axial axis substantially parallel to the direction in which the product carriers move the carcass parts, but rather with their axial axis positioned substantially perpendicularly thereto or at a different suitable angle.

So, according to the invention, first the back skin is harvested and only then the back meat. This has the advantage that the back skin can be harvested in the line in which, after all, the carcass part already hangs for the harvesting of the back meat and for the further processing of the back half. Furthermore, the connection between the upper back and back half imparts stability to the back, as a result of which the back skin is harvested in a more controlled manner.

U.S. Pat. No. 4,723,339 describes a method and apparatus for the removing of breast skin from a carcass part of slaughtered poultry. The carcass part is guided by a product carrier, hanging by its legs, along the skin removal apparatus. The method according to U.S. Pat. No. 4,723,339 is not suitable for the removal or harvesting of back skin because, unlike breast skin, back skin cannot be stretched. In addition, the breast skin is damaged considerably during removal if the apparatus according to U.S. Pat. No. 4,723,339 is used. The extent of the damage which the skin incurs during the removal thereof with the aid of the apparatus according to U.S. Pat. No. 4,723,339 is undesirable if the skin is to be sold as an independent product.

BRIEF DESCRIPTION OF THE DRAWINGS

The method and the apparatus according to the invention will be described in detail hereinafter, without entailing any limitation, with reference to the appended drawings, in which:

FIG. 1 is an overall illustration of the processing according to the invention;

FIG. 2 shows the making of the side cuts;

FIG. 3 shows the carcass part after the making of the side cuts according to FIG. 2;

FIG. 4 shows the making of the back cut;

FIG. 5 shows the carcass part after the making of the side cuts and the back cut;

FIG. 6 shows the harvesting of the back skin; and

DETAILED DESCRIPTION OF THE DRAWINGS

Figure 7:
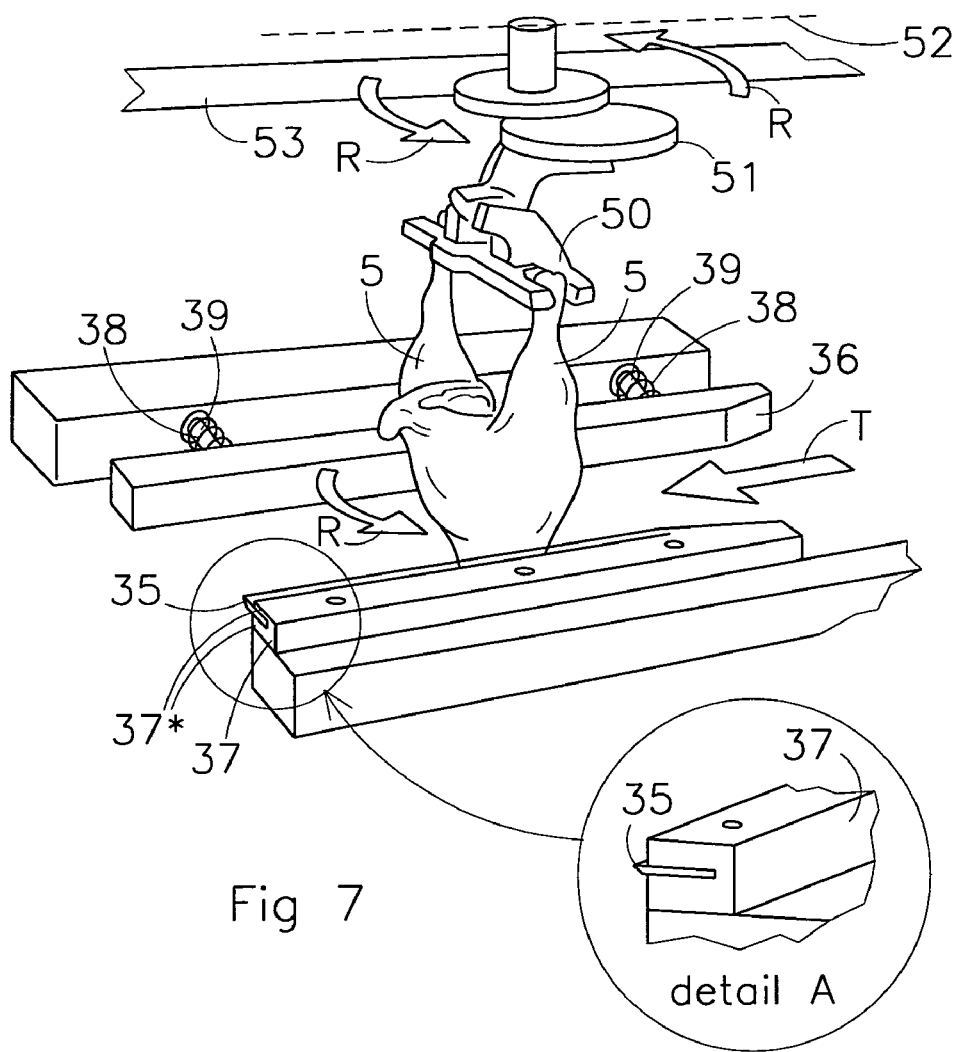
FIG. 7 shows the making in an alternative manner of one or more cuts for the method according to the invention.

The method according to the invention relates to the processing of a carcass part 1 of slaughtered poultry, in the present example chicken, which carcass part 1 has a front side 9, a rear 7 and two sides 6.

Before the relevant steps of the processing according to the invention are carried out, the initial carcass part 1 comprises a back piece 3 and at least a part of each leg 5. The back piece 3 has back meat 8 and back skin 4 which at least partially covers the leg parts. The legs 5 also still have skin attached to them, which is referred to in the present document as leg skin. The legs comprise at least the thighs and the back piece comprises at least a part of the upper back.

The initial carcass part 1, as is shown in the figures, is a poultry carcass, in the present case chicken, wherein the breast cap is missing as a result of the fact that it was removed in an earlier processing step, for example while the carcass part was suspended by its leg parts from a suitable product carrier.

FIG. 1 is an overall view of the processing according to the invention. The starting point is a carcass part 1 of slaughtered poultry, the breast cap having been removed (see FIG. 1A). The processing according to the invention described in the present document yields three products: a back half 101 comprising the two leg parts 5 (see FIG. 1C), a skinned back piece 3 (comprising the back meat 8) and, as the third product, the harvested back skin 4. With regard to the back meat 8 and back skin 4, reference is made to a FIG. 1B. After the described processing steps according to the invention, the back half 101 can be further processed to form, for example, drumsticks, chicken legs, thigh pieces and/or deboned leg meat.

The method according to the invention starts in the shown exemplary embodiment with the suspending of the carcass part 1 to be processed in a product carrier 50. The product carrier 50 is in this case adapted to engage the two leg parts 5 of the carcass part 1. In this example, the carrier 50 has for each of the leg parts a receiving slot, optionally provided with a locking member in order to block the leg parts in said slots. The product carrier 50 is configured to convey the carcass part 1 along a track 52 in a direction of conveyance T. The product carrier 50 is in this case attached to an overhead conveyor track 52 such as is generally known from the prior art in this field. Optionally, the product carrier 50 is rotatable about a vertical axis and/or rotatable about one or more other axes.

In the exemplary embodiment shown, the various steps of the method according to the invention are carried out in various processing stations, the overhead conveyor track guiding the product carriers along the processing stations. However, it is also possible for one or more of the processing steps to be carried out in a single station.

The product carrier 50 brings the carcass part 1, which is suspended by its legs 5 below the product carrier 50, to a first cutter of an apparatus (not shown in further detail), for example comprising a frame. Before the carcass part 1 reaches the first cutter, the carcass part 1 is intercepted by guides 16, for example as shown in FIG. 2. In the example of FIG. 2, the guides 16 are formed by rods between which the carcass part passes, although it is also conceivable to use plates or the like. Preferably, the space between the guides 16 at the end at which the carcass parts enter is relatively large in order subsequently to become smaller closer to the first cutter. The guides 16 are preferably attached above the first cutter. The guides 16 are in this case more effective because they act on a more substantial mass of the carcass part 1 hanging from the product carrier 50.

In this example, the first cutter comprises a first knife 15a and a second knife 15b which are arranged on both sides of the path of the carcass parts 1 in the frame of the apparatus. The knifes 15a, 15b of the first cutter are configured in the present case as rotating, in this case circular, blades. Each of the rotating blades 15a, 15b is attached to a shaft 17a, b and is driven by a motor 18a, b. As an alternative to the rotating blades, static blades can also be used on both sides of the path for the carcass parts 1.

The carcass part 1 is in this case guided with the breast side in front (viewed in the direction of conveyance T) between the rotating blades 15a, 15b. On entering the first cutter, the carcass part 1 experiences a certain degree of resistance, causing the carcass part 1 to tilt slightly about a horizontal axis which is substantially perpendicular to the direction of conveyance. As the first cutter passes through the carcass part 1, this resistance disappears, allowing the carcass part 1 to hang upright again. This gives rise to somewhat curved side cuts 10a, b in the sides of the carcass part 1. The curvature follows, to some extent, the contour of the thigh.

Each of the knifes 15a, b forms a side cut 10a, b in the respective side 6 of the carcass part 1. Each side cut 10a, b cuts through the skin on the carcass part 1 in such a way that, on the side 6 of the carcass part 1, the skin of the respective leg 5 and the skin of the back are separated from each other. The side cuts 10a, b are preferably located much possible at the location at which the back piece 3 is subsequently cut loose from the legs 5, i.e. between the respective thigh and the back of the carcass part 1 hanging from the product carrier.

It is possible to adjust the cutting depth of the knifes 15a, 15b in such a way that the meat which is located below the skin is also cut into or cut through. It is even possible to cut part of the back piece 3 away from the legs 5 as early as when the side cuts 10a, b are made. The backbone however stays intact.

In the exemplary embodiment of FIG. 2, the side cuts 10a, b are made substantially at the same time. However, it is also possible to make the side cuts 10a, b sequentially (first the one side cut and then the other). In fact, this also applies to an alternative variation (not shown) without a back cut.

FIG. 3 shows the carcass part 1 after the making of the side cuts 10a, b.

In this example, a back cut 11 is made after making the side cuts 10a, b. This is shown in FIG. 4. However, it is also possible to make first the back cut 11 and then the side cuts 10a, b.

In this case, the product carrier 50 brings the carcass part 1 to the second cutter which is accommodated in the frame (not shown in greater detail) of the apparatus. The second cutter is used to make the back cut 11. For making the back cut 11, the carcass part 1 is in this case rotated through a quarter of a turn, so instead of the front 9 of the carcass part 1 one of the sides 6 is directed forward (viewed in the direction of conveyance T).

In the exemplary embodiment of FIG. 4, the second cutter is configured as a rotating, in this case circular, blade 25. The rotating blade 25 is arranged along the path which the carcass parts 1 follow, hanging from the carriers 50. In order to be able to make the back cut 11 using the rotating blade 25 which is arranged along the path, the carcass parts 1 are rotated, during the conveyance from the first cutter 15a, b to the second cutter 25, in such a way that the carcass part 1 is moved, with one of the sides 6 in front (viewed in the direction of conveyance), by the product carrier 50 along the path. In this way, the rear of the carcass part 1 becomes directed to that side of the path on which the rotating blade 25 is arranged. This is shown in FIG. 4.

A guide 26, carried by the frame (not shown in greater detail) of the apparatus, ensures in this case that the carcass part 1 is pressed against the rotating blade 25. In the example of FIG. 4, use is made of a single guide 26 which is arranged opposite the rotating blade 25 along the path. Use can also be made of two guides which are arranged on both sides of the path which the carcass parts 1 follow. In that case, the second cutter protrudes somewhat above the guide which is arranged on the edge of the cutter or somewhat below said guide, thus allowing the carcass part 1 to be brought into contact with the second cutter. The guides can be configured in manners known to a person skilled in the art, for example as round or square rods or bars or as plates.

The depth of the back cut 11 is preferably limited in such a way that only the skin is cut through and not the meat located below the skin. Because the vertebral column forms the strongest connection between the back piece 3 and the legs 5, the vertebral column is preferably damaged as little as possible when the cut is made. This benefits the reliable cutting-loose of the skinned back piece.

In order to limit the cutting depth, the rotating blade 25 is preferably provided with a depth stop, in this case a cap 29 which rests against the circular blade. This cap 29 is attached to the upper side and/or the underside of the rotating blade 25. This cap 29 prevents the rotating blade 25 from penetrating the carcass part 1 too deeply.

The back cut 11 joins up with the side cuts 10a, b as closely as possible, so ideally one continuous cut is present in the skin between the legs 5 and the back of the carcass part 1 after passing the second cutter. This is shown in FIG. 5. If the cuts 10a, b, 11 do not exactly join up with one another, this is not necessarily a problem. Any small connections between the leg skin and the back skin 4 are detached during the picking of the back skin. It is additionally advantageous if the cuts are located substantially in one another's extension.

In an alternative embodiment (not shown), the back cut is omitted. In this variation, the rotating blades 15a, 15b are arranged in such a way that they also cut through the back meat. Reasonable effectiveness is achieved, in particular in the processing of chicken, if in this case the distance between the cutting edges of the rotating blades 15a, b is at most 40 millimetres. Preferably, this distance is selected between 10 and 20 millimetres; more preferably, this distance is approximately 15 mm. At these preferred values for the distance between the rotating blades 15a, b which form the side cuts, the harvesting of the back skin is more effective.

In this variation (not shown), static blades or other knifes can also be used. If other knifes are used, it is advantageous to make the ends of the two side cuts, on the side facing the vertebral column, at a mutual distance of at most 40 mm. Preferably, this distance is selected between 10 and 20 millimetres; more preferably, this distance is 15 mm.

FIG. 6 shows an example of the harvesting of the back skin 4. During the harvesting of the back skin 4, use is made in this case of a back skin harvester 30. The back skin harvester 30 comprises in this case four (preferably at least two) rotatable rolls 31 which are each provided with a helical profile 32. The rolls 31 are in this case arranged with their axial axis substantially parallel to the direction of conveyance T, although it is, for example, also possible to use rolls which are arranged transversely to the direction of conveyance T.

The profiles 32 on rolls 31 which are located next to one another act on the back skin 4 which is clasped between the profiles 32. As a result of the movement of the carcass part 1 with respect to the back skin harvester 30 and as a result of rotation of the rolls 32, the back skin 4 is pulled loose from the back meat 8. Preferably, the profiles move the back skin 4 in a direction which is opposite to the direction of conveyance T. This promotes the back skin 4 to be harvested in one piece. The cuts 10a, b and 11 define the back skin 4 which is removed with respect to the leg skin which then remains attached to the carcass part 1.

If four rolls 31 are used, they are preferably arranged in such a way that they match the shape of the carcass part 1, viewed in the direction of conveyance T.

Preferably, there is a certain amount of space between the rolls 31, so the skin is not ground between the rolls 31 but rather remains more or less intact.

Alternatively, other types of back skin harvesters can also be used. Examples include a back skin harvester based on de-rinding rolls or a back skin harvester in which a single roll interacts with a plate rather than with a second roll. The rolls which are used can be positioned, instead of with their axial axis substantially parallel to the direction in which the product carriers move the carcass parts, with their axial axis positioned substantially perpendicularly thereto or, if appropriate, in a different angular position.

In an advantageous embodiment (not shown), there are made, in addition to the aforementioned precuts on both sides of the vertebral column of the carcass part, two cuts which extend substantially parallel to the vertebral column. Preferably, these cuts are located adjacent to the vertebral column. It is advantageous if the apparatus is provided with two blades to make the two cuts. These blades may, for example, be two rotatable, disc-shaped blades which at the same time form these cuts. The advantage of making these additional cuts parallel to the vertebral column is that it allows the back skin to be basened more easily from the back meat. These blades can, if appropriate, be arranged resiliently with respect to the frame of the apparatus via a spring mechanism in such a way that they can move resiliently in a direction substantially perpendicular to the vertebral column as the carcass part passes.

After the harvesting of the back skin 4, the back meat 8 can be harvested in any suitable manner. For example, the back meat 8 can be harvested "in the line" in the case of a back meat harvester which is configured for this purpose and arranged along the line. On the other hand, it is also conceivable to remove the (portion of the) carcass part that carries the back meat from the product carrier and to take it out of the line and supply it to a stand-alone harvesting apparatus.

A possible harvesting method for the back meat is, for example, a pressing technique, for example using a bone press to which the carcass part carrying the back meat is supplied.

Other suitable harvesting methods for the back meat include, for example, the cutting-loose of the back meat or the scraping-loose of the back meat, both of which may or may not be carried out in the line.

Depending on the selected harvesting method for the back meat, the part comprising the legs of the carcass part can, in addition, be further processed to form chicken legs, drumsticks, deboned leg meat or the like.

In practice, it is conceivable that the back meat may have become slightly detached or loosened from the associated bone parts of the carcass even before the back skin is detached. However, for the most part, it will still be connected to the bone parts of the carcass part to be processed when the back skin is harvested.

FIG. 7 shows an alternative manner for making the back cut 11 and/or one or both side cuts 10a, b. In the alternative embodiment of FIG. 7, a static blade 35 is used instead of a rotating blade. The static blade 35 is attached in a holder 37 which holds the blade 35 in place. The holder 37 also ensures that the cutting depth remains limited.

In the shown example of FIG. 7, the holder has straight edges 37* which limit the cutting depth. Alternatively, these edges can also be of oblique configuration (such as the cap 29 from FIG. 4) or be rounded.

The guide 36 is in this case resiliently arranged in the frame (not shown) of the apparatus and pushes the carcass part 1 against the static blade 35. The resilient arrangement of the guide 36 is in this example provided by means of helical springs 38 around guide pins 39, although other means, which may be known to a person skilled in the art, are also possible.

If the embodiment of FIG. 7 is used to make all of the cuts 10a, b, 11, the carcass part 1 has to be rotated about its vertical axis with respect to the static blade 35. This is indicated in FIG. 7 by the rotation arrows R. It is beneficial if the carcass part is rotated in this way gradually rather than suddenly. Gradual rotation allows the instantaneous position of the carcass part to be controlled more effectively than in the case of sudden rotation.

The gradual rotation can be carried out by means of eccentric cams 51 which are attached between the product carrier 50 and the overhead conveyor track 52. The eccentric cams are operated by means of guides 53 which are arranged fixedly along the track. These guides enter into contact with the eccentric cams as the product carrier passes and bring the eccentric cams 51 gradually into the desired position.

After the harvesting of the back skin 4, the back meat 8 is separated from the part of the carcass part that comprises the legs. The remaining carcass part (i.e. the part comprising the legs) can afterwards be further processed to form chicken legs, drumsticks, deboned leg meat and/or the like.

The invention claimed is:

1. A method for the harvesting of back skin from a carcass part of slaughtered poultry, wherein the carcass part initially comprises at least a part of the upper back and at least a part of the legs connected to the back, from which carcass part the breast cap has been removed, wherein the part of the upper back has back meat and back skin, and wherein the leg parts comprise at least the thighs and are provided at least partially with leg skin, the leg skin being connected at least partially to the back skin, which carcass part has a front, a rear and two sides, which method includes the steps:
    suspending the carcass part in a product carrier, the product carrier engaging the leg parts,
    making a first and a second side cut in the hanging carcass part, which side cuts are located on the side parts on both sides of the carcass part and extend substantially perpendicularly to the vertebral column, wherein each side cut separates at least the leg skin on the respective side of the carcass part from the back skin,
    detaching the back skin from the back meat, and
    harvesting the back meat after the back skin has been detached from the back meat.

2. The method according to claim 1, wherein the method further includes making a back cut, which back cut is located on the rear of the carcass part and substantially separates the back skin from the leg skin.

3. The method according to claim 2, wherein first the side cuts are made and then the back cut.

4. The method according to claim 2, wherein first the back cut is made and then the side cuts.

5. The method according to claim 2, wherein first a first side cut is made, then the back cut and then the other side cut.

6. The method according to claim 2, wherein a single continuous cut is made which comprises the first side cut, the back cut and the second side cut.

7. The method according to claim 2, wherein the depth of the back cut is selected in such a way that only back skin is cut through.

8. The method according to claim 2, wherein the back cut and the side cuts are located substantially in line with one another.

9. The method according to claim 1, wherein the depth of the side cuts is selected in such a way that both skin is cut through and a part of the underlying meat is at least partially cut into.

10. The method according to claim 1, wherein during the making of at least one of the aforementioned cuts, the carcass part is rotated with respect to a cutter which makes the respective cut.

11. The method according to claim 1, wherein said step of harvesting the back meat further comprises the step of detaching the back meat from the remainder of the carcass part.

12. In combination,
    a product carrier for the conveying of a carcass part of slaughtered poultry suspended from said product carrier in a direction of conveyance, said product carrier comprising a leg receiving element for engaging on a leg part of said carcass part, and
    an apparatus for the harvesting of back skin from said carcass part of slaughtered poultry, wherein the carcass part initially comprises at least a part of the upper back and at least a part of the legs connected to the back, from which carcass part the breast cap has been removed, wherein the part of the upper back comprises back meat and back skin, and wherein the leg parts comprise at least the thighs and are provided at least partially with leg skin, the leg skin being connected at least partially to the back skin, which carcass part has a front, a rear and two sides,
    which apparatus comprises:
    a first cutter for forming a first and a second side cut, which side cuts are located on the side parts on both sides of the carcass part and extend substantially perpendicularly to the vertebral column, wherein each side cut separates at least the leg skin on the respective side of the carcass part from the back skin,
    a second cutter for making a back cut, which back cut is located on the rear side of the carcass part and substantially separates the back skin from the leg skin,
    a back skin harvester for detaching the back skin from the back meat, and
    a back meat harvester for the harvesting of back meat from which the skin has already been removed.

13. The apparatus according to claim 12, wherein the first cutter comprises:
    a first knife for making the first side cut, and
    a second knife for making the second side cut.

14. The apparatus according to claim 13, wherein the first cutter comprises:
    a first knife for making the first side cut, and
    a second knife for making the second side cut.

15. The apparatus according to claim 12, wherein the first and the second cutter are integrated into a single knife.

16. The apparatus according to claim 12, wherein the apparatus further comprises a guide for guiding the carcass part to be processed along at least one of the cutter and/or the back meat harvester.

17. The apparatus according to claim 12, wherein the cutter comprises at least one rotating blade.

18. The apparatus according to claim 12, wherein the cutter comprises at least one static blade.

19. In combination,
    a product carrier for the conveying of a carcass part of slaughtered poultry suspended from said product carrier in a direction of conveyance, said product carrier comprising a leg receiving element for engaging on a leg part of said carcass part, and an apparatus for the harvesting of back skin from said carcass part of slaughtered poultry, wherein the carcass part initially comprises at least a part of the upper back and at least a part of the legs connected to the back, from which carcass part the breast cap has been removed, and wherein the part of the upper back comprises back meat and back skin, and wherein the leg parts comprise at least the thighs and are provided at least partially with leg skin, the leg skin being connected at least partially to the back skin, which carcass part has a front, a rear and two sides, which apparatus comprises:

a first cutter for making a first and a second side cut, which side cuts extend substantially perpendicularly to the vertebral column and are located on the side parts on both sides of the carcass part, wherein each side cut separates at least the leg skin on the respective side of the carcass part from the back skin, a back skin harvester for detaching the back skin from the back meat, and a back meat harvester for the harvesting of back meat from which the skin has already been removed, which back meat harvester is located, viewed in the direction of conveyance, upstream of the back skin harvester.

20. The apparatus according to claim 19, wherein the apparatus further comprises a cutter for the making of a back cut, which back cut is located on the rear of the carcass part and substantially separates the back skin from the leg skin.

21. The apparatus according to claim 19, wherein the first cutter has two knifes which are positioned with respect to each other in such a way that the smallest distance between the two side cuts which are made by these knifes on the side facing the vertebral column is at most 40 millimetres.

22. The apparatus according to claim 21, wherein the distance between the two side cuts on the side facing the vertebral column is between 10 and 20 millimetres, more preferably 15 mm.

23. The apparatus according to claim 19, wherein the apparatus further comprises a guide for guiding the carcass part to be processed along at least one of the cutter and/or the back meat harvester.

24. The apparatus according to claim 19, wherein the cutter comprises at least one rotating blade.

25. The apparatus according to claim 19, wherein the cutter comprises at least one static blade.

* * * * *